Aug. 30, 1938.  A. L. THAYER  2,128,335
DRAFTLESS VENTILATOR AND AIR CLEANER FOR AUTOMOBILES
Filed March 30, 1937
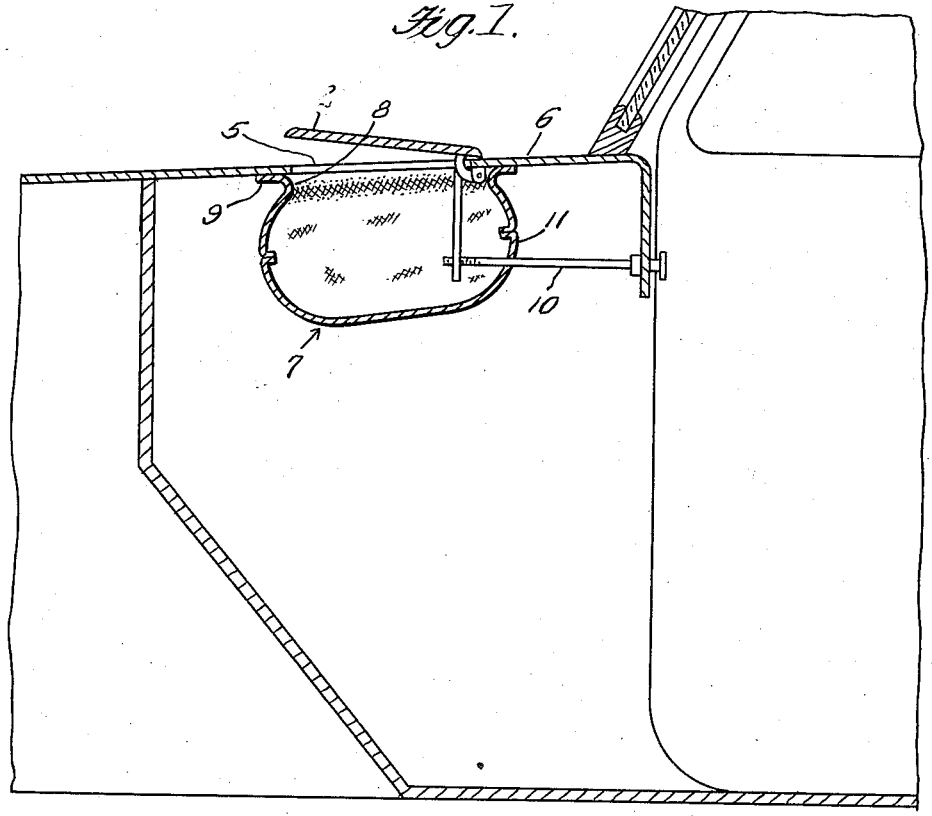
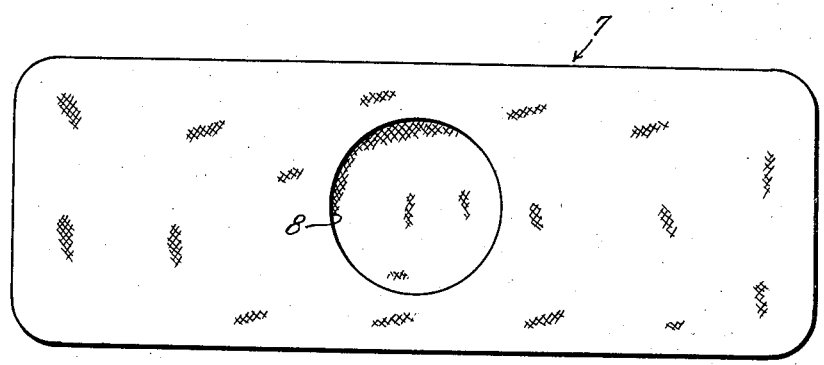
Inventor
Albert L. Thayer
By Clarence A. O'Brien
Hyman Berman
Attorneys Patented Aug. 30, 1938

2,128,335

UNITED STATES PATENT OFFICE 2,128,335

DRAFTLESS VENTILATOR AND AIR CLEANER FOR AUTOMOBILES

Albert L. Thayer, Lewiston, Idaho

Application March 30, 1937, Serial No. 133,915

1 Claim. (Cl. 98—2)

This invention relates to a ventilating and air cleaning device for automobiles, and the object of the invention is to provide such a device which will have no tendency whatever to cause a draft, but which at the same time will insure a thorough ventilating and cleansing of the air within the interior of an automobile body.

Briefly, the invention consists in providing in conjunction with a suitable opening in a suitable part of an automobile body an air filtering element through which the air from the exterior will pass into the interior of the automobile body in a clean condition free of all impurities for ventilating the interior of said body to the greater comfort and health of the occupants thereof.

The invention, together with its objects and advantages, will be best understood from a study of the following description taken in connection with the accompanying drawing, wherein:

Figure 1 is an enlarged detail sectional view illustrating the application of the invention to an automobile.

Figure 2 is a plan view of an air filtering element embodying the features of the present invention.

Referring to the drawing by reference numerals, and more in detail, it will be seen that I have illustrated the invention as applied to an automobile for purifying the air entering the interior of the body of the automobile through the ventilator opening 5 in the cowl 6 of the automobile.

In the preferred embodiment thereof the filtering element indicated by the reference numeral 7 is in the form of an elongated bag formed of a suitable mesh material which will permit air to pass therethrough and which at the same time will serve to filter the air of all impurities.

The bag 7 at the top side thereof and intermediate its ends is provided with an opening 8 and the edge of the filtering medium 7 about the opening 8 is secured to the under side of the cowl 6 about the opening 5 as at 9 and through the medium of bolts or other fastening elements or as otherwise may be found desirable.

To accommodate the push and pull operating rod 10 provided for the door or cover plate 12 that controls the passage of air through the ventilator opening 5, the filtering bag or element 7 at one side thereof is provided with a suitable opening 11.

It will be seen that with the filtering element 7 thus positioned and applied, air entering the interior of the automobile body through the ventilating opening 5 will pass through the bag or filtering element 7, and in so doing will be cleansed of all impurities so that clean fresh air passes from the exterior of the automobile or from the atmosphere into the interior of the automobile body, so that there will be at all times a circulation of clean fresh air in said automobile body.

Also, through the provision of such a filtering element 7, this clean fresh air may be admitted to the interior of the automobile body without any such air stream as constitutes a draft and as such is of course objectionable.

It is thought that a clear understanding of the nature, utility and advantages of an invention of this character will be had without a more detailed description.

Having thus described the invention, what is claimed as new is:

In combination with an automobile body including a hood provided with a ventilating opening, of an air filtering and ventilating device consisting of a sack of porous fabric having an opening in a wall thereof arranged in registry with said ventilating opening, said sack being secured at the edge thereof defining said opening to the hood at the under side of the latter and in alignment with said ventilating opening, and said sack being also provided with a preformed opening therein to accommodate the usual ventilator-door operating rod.

ALBERT L. THAYER.